No. 704,128. Patented July 8, 1902.
W. S. SEYMOUR.
UMBRELLA RUNNER RETAINER.
(Application filed Apr. 11, 1901.)
(No Model.)

Witnesses:-

Inventor:-
William S. Seymour
by his Attorneys:-
Howson & Howson

UNITED STATES PATENT OFFICE.

WILLIAM S. SEYMOUR, OF PHILADELPHIA, PENNSYLVANIA, ASSIGNOR TO PENNSYLVANIA TUBE COMPANY, OF PHILADELPHIA, PENNSYLVANIA, AND CAMDEN, NEW JERSEY, A CORPORATION OF NEW JERSEY.

UMBRELLA-RUNNER RETAINER.

SPECIFICATION forming part of Letters Patent No. 704,128, dated July 8, 1902.

Application filed April 11, 1901. Serial No. 55,367. (No model.)

*To all whom it may concern:*

Be it known that I, WILLIAM S. SEYMOUR, a citizen of the United States, residing in Philadelphia, Pennsylvania, have invented certain Improvements in Umbrella-Runner Retainers, of which the following is a specification.

My invention relates to certain improvements in umbrella-runner retainers used for retaining the umbrella or parasol either in the open or closed position.

The object of my invention is to improve the construction of an umbrella-runner retainer, so as to dispense with all unnecessary perforations in the stick and to simplify the construction of the retainer.

Figure 1:
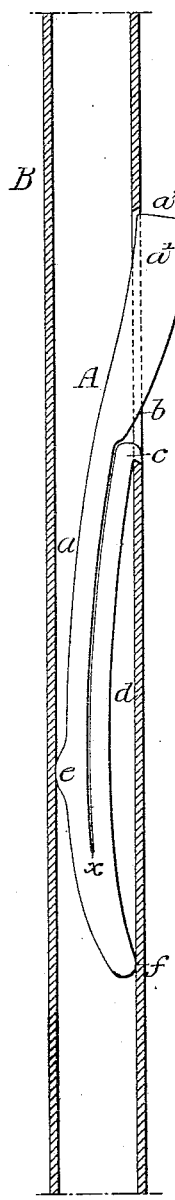
Figure 2:
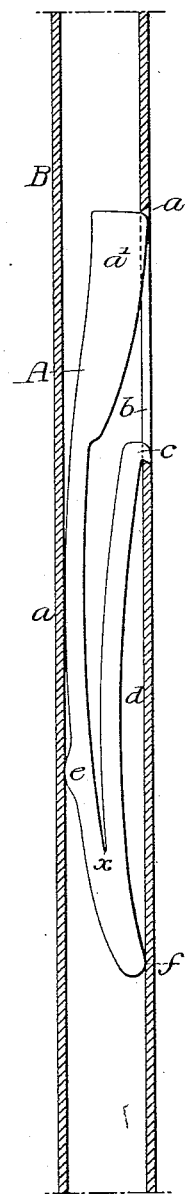
Figure 3:
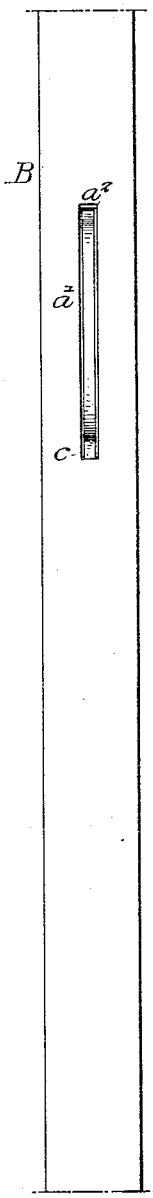
Figure 4:
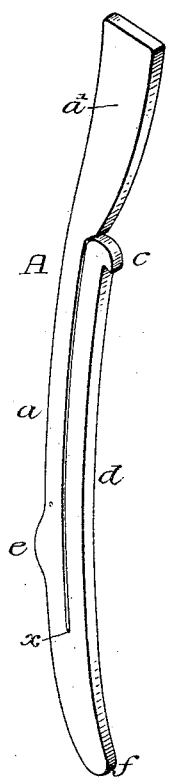

In the accompanying drawings, Figure 1 is a sectional view of my improved umbrella-retainer within a stick and projected. Fig. 2 is a view similar to Fig. 1 with the retainer depressed. Fig. 3 is a view looking in the direction of the arrow, Fig. 1. Fig. 4 is a detached perspective view of the umbrella-runner retainer.

A is the umbrella-runner retainer. This retainer is made, preferably, from a single piece of sheet metal formed in the manner clearly shown in Fig. 4, having two arms $a\ d$, united at $x$. The spring-arm $a$ has a retaining portion $a'$ at one end, which extends through a slot $b$, cut in the tube or stick B. The slot $b$ is somewhat longer than the retaining portion $a'$, and extending into the balance of the slot is a lug $c$ on the end of the arm $d$ of the retainer A. The slot $b$ in the present instance is cut in the stick by a circular saw or cutter, and the lug $c$ on the arm $d$ is undercut to fit the beveled walls of the slot, as shown. At the base of the retainer is a bearing portion $e$ on one side and a bearing portion $f$ on the opposite side. The bearing portion $f$ rests against the front wall of the tube, while the bearing portion $e$, which is between the bearings $c$ and $f$, rests against the back wall of the tube, as clearly shown in Figs. 1 and 2. By this construction there are three fixed bearing-points of the retainer within the tube—one at $c$, one at $e$, and the other at $f$—making a rigid support for the retainer, while the arm $a$ is perfectly free to be moved within the stick from the position shown in Fig. 1 to the position shown in Fig. 2. This construction allows for a very long spring-section $a$, so that the retainer can be operated without the liability of snapping the spring-section, which often occurs in short spring-retainers. Furthermore, the retaining portion $c'$ and the lug $c$ entirely fit the slot $b$ when the retainer is in the position shown in Fig. 1, and any pressure on the end $a^2$ of the retainer will cause the lug $c$ to bear upon the end of the slot $b$ of the stick as it is undercut, so that it will be impossible to force the retainer out of position by any pressure on the end of the retainer. The rear end of the retaining portion $a'$ is always in the slot $b$, so that it is held in position in both directions.

It will be noticed that while by my improved construction the retainer is confined between the walls of the tube, said retainer having the bearing $f$, fulcrum $e$, and the undercut portion $c$ to engage the end of the slot, it has no single portion which takes up the full width of the interior of the tube.

My retainer is made of spring metal, intended to be sprung into position, and is of a lengthened curve of comparatively narrow width in its entirety. Such construction permits, therefore, its use with tubes of varying internal diameter with quite a wide range of adjustment. For instance, a retainer intended for use with a tube having an internal diameter of one-fourth of an inch is equally available for use with tubes having an internal diameter ranging from three-sixteenths to five-sixteenths of an inch. Hence its use is not confined to any one size of tube, nor is it impaired when the internal diameters of the tubes vary, as it is well understood that a uniform internal diameter cannot be maintained in the manufacture of tubes of this character.

In order to remove the retainer, all that is necessary is to grasp the retaining portion $a'$ by a pair of pincers and pull it out by force, and the entire retainer can be withdrawn through the slot.

The retainer can be readily placed within the stick by simply forcing it in and allowing the head to snap back of the end of the slot. The common method now used is to perforate the stick some distance from the slot and to provide the retainer with a lug which will project through the perforation. This makes it unsightly, and it is an unnecessary expense, and it is difficult to remove and replace the retainer when desired, or the retainer is pinned in the stick, which makes the retainer a fixture.

I claim as my invention—

1. An umbrella-runner retainer for use with hollow umbrella-sticks, said retainer having two long, curved arms, the combined width of said arms being less than the internal diameter of the tube, one of said arms having an undercut lug extending into the slot of the stick, the other arm having a lug forming a fulcrum for engaging the opposite wall of the stick, and a portion joining said arms and curved so that its end will engage the wall opposite the fulcrum and below the latter, substantially as described.

2. As a new article of manufacture, an umbrella-runner retainer made of a single piece of metal and having the curved spring-arms $a$ and $d$ of less width than the internal diameter of the tube, said arm $a$ having a projecting retaining portion for the spring-arm $d$, said arm $d$ having an undercut securing-lug for engagement with the wall of the slot, said retainer having bearing portions $e$ and $f$, the bearing portion $e$ being carried by the spring-arm $a$ and the other formed by the end of the curved metal piece from which the two arms spring, said bearing portions engaging opposite walls of the tube at some distance from each other, substantially as described.

In testimony whereof I have signed my name to this specification in the presence of two subscribing witnesses.

WILLIAM S. SEYMOUR.

Witnesses:
  WILL. A. BARR,
  JOS. H. KLEIN.